UNITED STATES PATENT OFFICE.

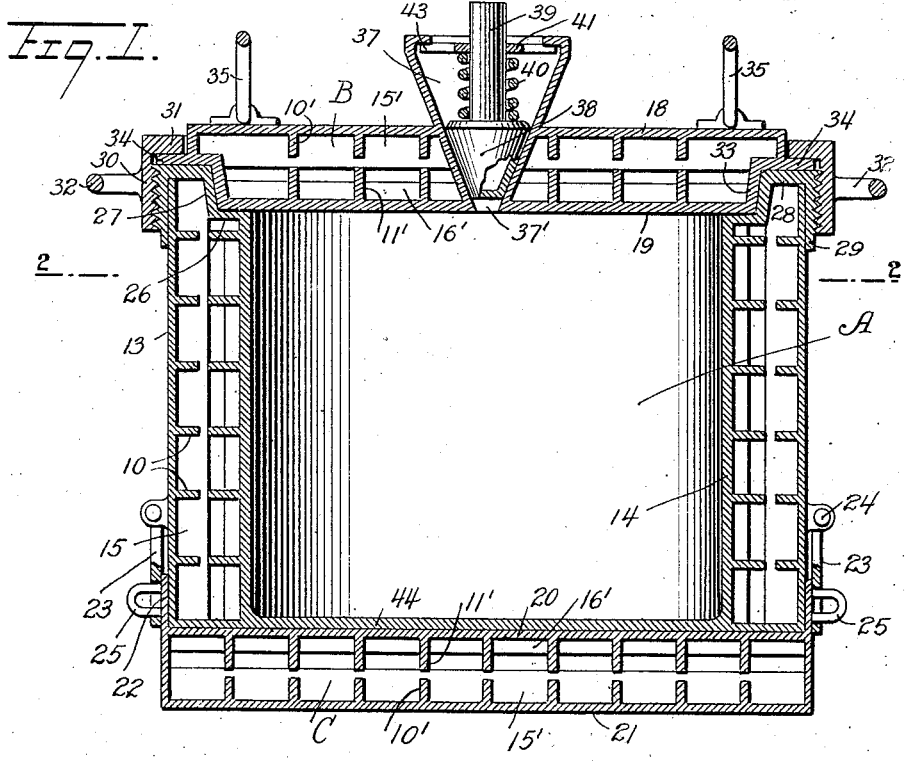
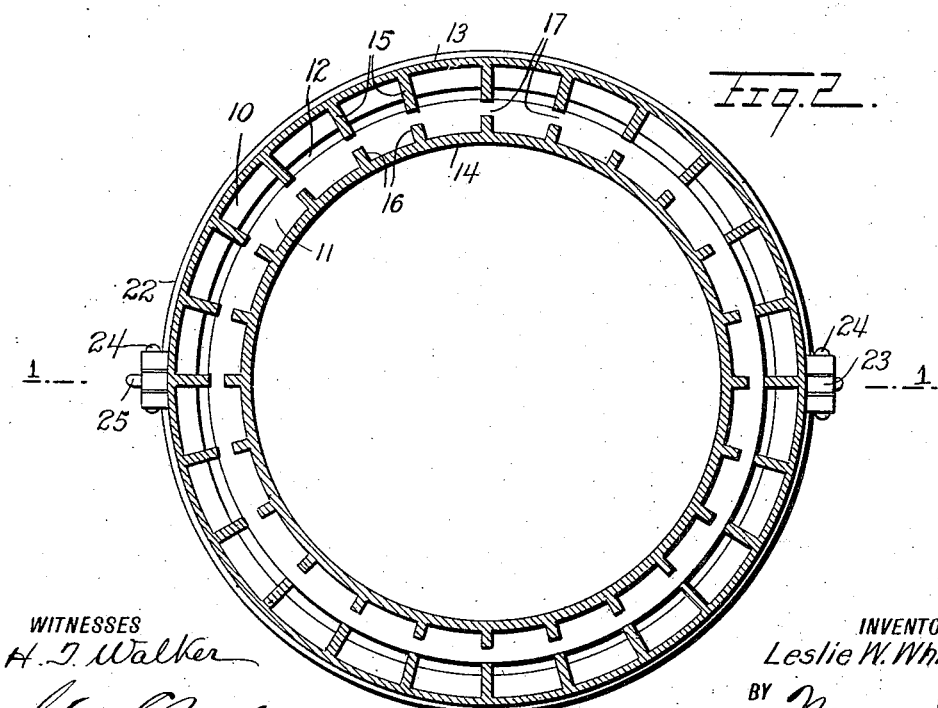

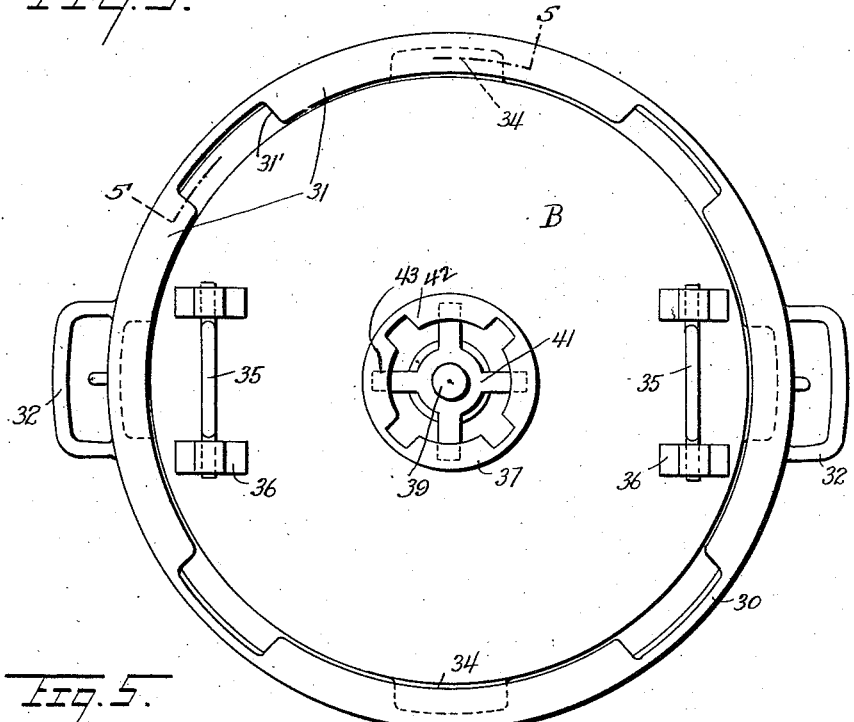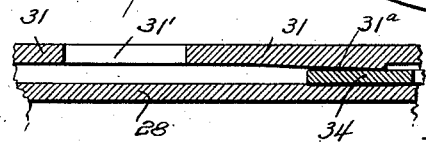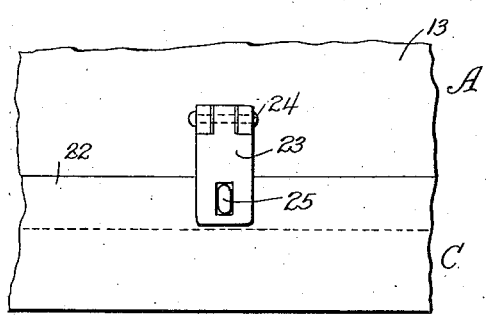

LESLIE W. WHITE, OF RIDGWAY, MONTANA.

HEAT-INSULATED RECEPTACLE.

1,095,759.   Specification of Letters Patent.   Patented May 5, 1914.

Application filed April 11, 1913. Serial No. 760,411.

*To all whom it may concern:*

Be it known that I, LESLIE W. WHITE, a citizen of the United States, and a resident of Ridgway, in the county of Custer and State of Montana, have invented a new and Improved Heat-Insulated Receptacle, of which the following is a full, clear, and exact description.

This invention relates to cooking apparatus, and has particular reference to receptacles having for their purpose the making of a device combining the features of a sterilizing vessel and a fireless cooker.

Among the objects of this invention is to construct a utensil comprising a comparatively small number of parts providing for a receptacle or kettle proper having a lid adapted to be sealed for the purpose of retaining the vapors and flavors up to a certain desired high pressure.

A further object of the invention is to provide for the kettle a peculiar form or construction of insulated bottom which, when attached to the kettle, will constitute the device as an effective fireless cooker.

The foregoing and other objects of the invention will hereinafter be more fully described and claimed and illustrated in the drawings forming a part of this specification in which like characters of reference indicate corresponding parts in all the views, and in which—

Figure 1 is a vertical sectional view of the complete device taken on the line 1—1 of Fig. 2; Fig. 2 is a transverse section on the line 2—2 of Fig. 1; Fig. 3 is a plan view corresponding to Fig. 1; Fig. 4 is a detail, in elevation, of the hasp; and Fig. 5 is a detail on the line 5—5 of Fig. 3.

The several parts of this device may be made of any suitable materials, and the relative sizes and proportions, as well as the general design of the construction, may be varied to a considerable extent without departing from the spirit of the invention hereinafter more fully set forth and specifically claimed.

As above premised, the construction includes three principal parts, namely, a kettle A, a lid B, and a detachable bottom C. Each of these three parts is made up of substantially parallel spaced walls which may be of any suitable comparatively thin like material, the spacing being intended for the purpose of providing a vacuum within such part, whereby I provide for the maximum degree of insulation with respect to heat and cold. In order to prevent any possibility of collapse of the two walls with respect to each other due to external pressure, I provide an internal bracing of peculiar construction, the same including sets of ribs of any suitable form, but certain of the ribs being arranged with crisscross relation to others of the ribs. More specifically, the bracing for the kettle, which is shown of a substantially cylindrical configuration, comprises pairs of ribs 10 and 11 which extend around the kettle circumferentially, each pair of said ribs lying substantially in the same plane, but spaced from each other at 12. The ribs 10 are connected to the outer wall 13, and the ribs 11 are connected to the inner wall 14, and the ribs 11 are shown as being broader than the others. At 15 are shown vertical ribs extending inwardly from the wall 13 and abutting against the outer peripheries of the ribs 11. The ribs 11 and 15, therefore, constitute the principal bracing supports for the walls. Additional strength is produced by the narrower ribs 10 and the corresponding ribs 16 extending vertically along the wall 14 and toward the ribs 15. Spaces 17 are left between adjacent ribs 15 and 16, whereby all of the interior of the space between the walls 13 and 14 may be made into a vacuum. The lid B likewise includes outer and inner walls 18 and 19 having a checker work internal bracing including ribs 10', 11', 15' and 16', corresponding in general each to each with the ribs of the kettle above described. The bottom C is substantially flat, comprising upper and lower walls 20 and 21, and internal bracing ribs arranged substantially as already described, and numbered for identification the same as those of the lid. The bottom also includes an upwardly projecting rim or flange 22 within which the bottom of the kettle is adapted to be seated and secured by any suitable means as, for instance, by a plurality of hasps 23 hinged at 24 to the wall 13 of the kettle and engaging over staples 25 extending outwardly from said rim 22 and through which the kettle and its bottom may be locked together securely.

In the formation of the kettle, the inner wall 14 is extended outwardly at its upper edge forming a horizontal flange 26, and thence is bent upwardly and slightly outwardly, as shown at 27, forming a seat, and thence horizontally again as shown at 28, and thence directly downwardly forming a flange 29 snugly overlapping the upper end of the outer wall 13 forming in any suitable way an airtight joint between the two parts of the kettle. The flange 29 is provided with screw threads, as shown in Fig. 1, for the reception of a collar 30 having corresponding threads and also having a series of inwardly projecting lips 31 spaced one from another, as indicated at 31', Fig. 3. As shown by reference to Figs. 3 and 5, each of the lips 31 is arranged on its lower surface with a cam or spiral 31ᵃ. Said collar is provided with a pair of handles 32, whereby it may be manipulated.

The lid B has its inner wall 19 formed with a flaring portion 33 complemental to the seat 27 with which it coöperates, and also the lid is formed with outwardly projecting tongues 34 corresponding to the spaces 31' of the collar through which they are adapted to be passed for the purpose of locking the lid to the kettle, as shown in Fig. 3. The lid, also, is provided with handles 35 secured thereto by ears 36 or in any other suitable manner, whereby the lid may be turned through a partial rotation into the position shown in Fig. 3, and in which position the tongues 34 lie beneath the lips 31 of the collar. A slight rotation of the collar with the lid in this position serves to effect an airtight seal through the beveled portions 33 and 27. When the lid is put in place and after the tongues 34 pass through the spaces 31' they are caused to come into engagement with the above mentioned spirals or cams with the result that the conical surfaces of the arches 33 and 27 will be forced together substantially snugly, but inasmuch as the movement of the lid just described requires the rotation thereof, the friction between the lid and the seat prevents the close sealing which may be brought about by subsequently giving the collar 30 a slight rotation so as to force the cams 31ᵃ down more firmly upon the tongues 34 and hence completing the sealing of the vessel. By confining the steam or vapors during the cooking operation until the contents of the kettle reach a temperature of approximately 280 degrees, a thorough sterilization and rapid cooking of the contents are sure to result.

In order to insure safety, however, to the device thus far described, I provide an automatic valve comprising a conical seat 37 through which communication may be had from the interior of the kettle at 37'. A conical valve 38 is seated within said valve seat and normally closes the outlet 37'. Said valve 38, like the main parts of the device, is preferably made hollow to increase the insulating efficiency thereof and reduce the weight to a minimum. The valve also is provided with an upwardly projecting stem 39 which is surrounded by a spring 40. A spider 41 having at its center a hole to receive the valve stem is interlocked within the top of the valve seat 37 by means of a series of inwardly projecting lips 42 between and under which the ends 43 of the spider operate. The spring 40 operates at one end against the spider and at the other end against the valve 38, and has sufficient strength to maintain the internal pressure desired. When, however, the pressure exceeds the desired amount, the valve will be unseated against the spring until the pressure is reduced.

With the kettle filled with material to be treated and stood upon a stove with its bottom plate 44 in direct contact with the source of heat, the contents of the kettle will become heated according to the nature thereof to the desired degree, and then the kettle is placed within the rim 22 of the false bottom C and there secured if it is desired to employ the device as a fireless cooker. For the purpose of increasing the sealing efficiency of the device, the co-acting surfaces, such as between the valve 38 and its seat and the parts 33 and 27, may be turned in a lathe. Also, in the construction of the kettle walls, the coöperating ribs 11 and 15 may likewise be turned or ground in order to secure a more accurate fit.

Having thus described my invention, I claim as new and desire to secure by Letters Patent:—

1. In a heat insulated receptacle, the combination of a device having a pair of spaced parallel walls forming a vacuum chamber, said walls being formed of comparatively thin material, and internal bracing devices serving to prevent collapse of the walls, said bracing devices including sets of broad ribs applied to the respective walls and extending therefrom toward and into engagement with each other, the ribs of each set being parallel to one another and meeting the ribs of the other set at right angles, and a set of narrower ribs intersecting the broad ribs applied to the same wall, and each broad rib of one wall lying in the same plane as a narrower rib of the opposite wall, substantially as set forth.

2. In a device of the character set forth, the combination of a pair of spaced parallel walls forming a vacuum chamber, said walls being formed of comparatively thin material, and bracing devices between said walls, said bracing devices including sets of broader and narrower ribs extending toward each other in pairs but spaced from each other, the ribs of each pair lying in the same plane, and other sets of pairs of broader and narrower ribs arranged angularly with respect to the first sets of ribs, the broader ribs of one set being applied to one wall and engaging the broader ribs of the other set applied to the other wall and engaging one another each to each.

In testimony whereof I have signed my name to this specification in the presence of two subscribing witnesses.

LESLIE W. WHITE.

Witnesses:
ALMA M. JOHNSON,
OSCAR E. JOHNSON.